US008929291B2

United States Patent
Kim et al.

(10) Patent No.: US 8,929,291 B2
(45) Date of Patent: Jan. 6, 2015

(54) APPARATUS AND METHOD FOR TRANSMITTING/RECEIVING UPLINK POWER CONTROL INFORMATION

(75) Inventors: Dong Cheol Kim, Anyang-si (KR); Han Gyu Cho, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 13/634,766

(22) PCT Filed: Mar. 21, 2011

(86) PCT No.: PCT/KR2011/001923
§ 371 (c)(1),
(2), (4) Date: Nov. 26, 2012

(87) PCT Pub. No.: WO2011/118944
PCT Pub. Date: Sep. 29, 2011

(65) Prior Publication Data
US 2013/0064199 A1    Mar. 14, 2013

Related U.S. Application Data

(60) Provisional application No. 61/315,974, filed on Mar. 21, 2010.

(51) Int. Cl.
| | | |
|---|---|---|
| H04Q 7/00 | (2006.01) | |
| H04Q 7/24 | (2006.01) | |
| H04W 52/24 | (2009.01) | |
| H04J 11/00 | (2006.01) | |
| H04J 13/00 | (2011.01) | |
| H04W 52/14 | (2009.01) | |

(52) U.S. Cl.
CPC ......... H04W 52/243 (2013.01); H04J 11/0023 (2013.01); H04J 13/00 (2013.01); H04W 52/146 (2013.01); H04W 52/247 (2013.01)
USPC .......................................... 370/328; 370/338

(58) Field of Classification Search
None
See application file for complete search history.

(56) References Cited

U.S. PATENT DOCUMENTS

| | | | |
|---|---|---|---|
| 7,689,186 B2 * | 3/2010 | Matoba et al. ............. | 455/180.1 |
| 8,280,417 B2 * | 10/2012 | Venkatachalam et al. .... | 455/466 |
| 8,503,389 B2 * | 8/2013 | Tanaka et al. ................. | 370/330 |
| 8,559,997 B2 * | 10/2013 | Nibe et al. .................... | 455/522 |
| 2006/0094372 A1 * | 5/2006 | Ahn et al. .................. | 455/67.13 |
| 2010/0208608 A1 * | 8/2010 | Wang ............................ | 370/252 |
| 2011/0116410 A1 * | 5/2011 | Sung et al. .................... | 370/252 |

FOREIGN PATENT DOCUMENTS

| | | |
|---|---|---|
| KR | 10-2005-0020547 | 3/2005 |
| KR | 10-2006-0014544 | 2/2006 |
| KR | 10-2009-0102419 | 9/2009 |

* cited by examiner

*Primary Examiner* — Hong Cho
(74) *Attorney, Agent, or Firm* — McKenna Long & Aldridge LLP

(57) ABSTRACT

Disclosed are an apparatus and method for transmitting or receiving uplink power control information. According to the present invention, a transmitting antenna of a base station device transmits, to a terminal, a first message containing first information on the interference and noise levels of frequency partitions to which an uplink data channel and an uplink control channel are allocated. Here, the uplink data channel and the uplink control channel are allocated to different frequency partitions. The transmitting antenna can further transmit, to the terminal, information on frequency partitions to which the uplink data channel and the uplink control channel are allocated.

10 Claims, 2 Drawing Sheets

APPARATUS AND METHOD FOR TRANSMITTING/RECEIVING UPLINK POWER CONTROL INFORMATION

This Application is a 35 U.S.C. §371 National Stage Entry of International Application No. PCT/KR2011/001923, filed Mar. 21, 2011 and claims the benefit of U.S. Provisional Application No. 61/315,974, filed Mar. 21, 2010, all of which are incorporated by reference in their entirety herein.

TECHNICAL FIELD

The present invention relates to wireless communication, and more particularly, to an apparatus and method for transmitting and receiving uplink power control information.

BACKGROUND ART

A broadband wireless communication system is based on an Orthogonal Frequency Division Multiplexing (OFDM) scheme and an Orthogonal Frequency Division Multiple Access (OFDMA) scheme, and high-speed data transmission is possible by transmitting physical channel signals using a multiple of sub-carriers.

In a wireless communication system, synchronization between a transmitter and a receiver is necessary for reception and demodulation of data. Particularly, in a wireless communication system in which a channel environment between a base station (BS) and a mobile station (MS) is continually changed, the base station and the mobile station should be synchronized through signaling for successful transmission and reception of data. In downlink, the base station transmits signals to mobile stations at one time based on one standard timing, but in uplink, several mobile stations separately transmit signals, and thus each signal arrives at different time points, thereby generating a propagation delay. Thus, there is a need for a separate timing synchronization method and this method is "ranging". That is, ranging is a procedure for appropriately adjusting synchronization by several mobile stations within the transmission time.

Multiple mobile stations are synchronized with data frames transmitted from the base station in downlink. As one way for synchronization of mobile stations, the base station may insert a preamble for synchronization into part of transmitted frames. Likewise, mobile stations are synchronized with the downlink channel through the preamble. Further, the base station may utilize a separate synchronization channel.

In uplink, each mobile station should transmit data to the base station through time and/or frequency area allocated to the mobile station itself so that interference between mobile stations is avoided and the base station receives data. Therefore, synchronization should be avoided through signaling between the base station and the mobile station in consideration of the channel environment of each mobile station for uplink synchronization.

Initial ranging is the procedure to obtain an accurate timing offset between the MS and the BS and to adjust transmission power. When an MS is turned on, the MS achieves downlink synchronization from downlink preambles. Subsequently, the MS performs initial ranging so as to adjust uplink timing offset and transmission power. After initial ranging is completed, periodic ranging is a process periodically performed to track uplink timing offset and received signal strength. In addition, there are a bandwidth request ranging process where the MS requires bandwidth to the base station, and a handover ranging process performed by the MS for synchronization with another base station.

Handover ranging is a process which is necessary for a moving mobile station to perform handover to a target base station. Handover ranging is the same as the initial ranging except the fact that a non-competition type initial ranging transmission opportunity may be obtained in order for the MS and the target BS to perform a transmission and reception procedure of a management message for network entrance and reentrance. The MS may inform the target BS of the current performance of the handover by including the ranging target indicator information in the ranging request message. Here, if the target BS does not receive the information of the MS in advance through the backbone, the target BS may request the information on the MS to the BS through the backbone.

In an Orthogonal Frequency Division Multiple Access (OFDMA) system utilizing a multi-carrier scheme, resources are allocated in units of subchannels, each including subcarriers. A plurality of users separately share all subcarriers, such that multi-user diversity gain is obtained in the frequency domain. In an OFDMA broadband mobile Internet access system such as WiBro, all cells reuse the same frequency and an Adaptive Modulation & Coding (AMC) scheme is applied according to received signal strength and interference between neighbor cells due to reuse of the same frequency, thereby maximizing throughput.

However, in such a system having a Frequency Reuse Factor (FRF) of 1, inter-cell interference is severe and throughput reduction is inevitable at edges (i.e., boundaries) of cells or sectors. This may cause service outage. In a method for improving performance at cell edges when a frequency reuse factor of 1 is used, all subcarriers are orthogonally divided into a number of frequency partitions and the frequency partitions are appropriately arranged in cells such that a specific frequency partition is not used or is used at low power in each cell, thereby reducing interference of the same channel between neighbor cells. This method is referred to as Fractional Frequency Reuse (FFR).

Likewise, FFR is a technology for improving communication performance of a cell boundary user under a multi-cell based environment. Generally, a cell or sector includes a multiple of frequency partitions, and each frequency partition may be respectively allocated to MSs in a certain condition. In order to apply FFR in an actual system, which frequency partition (or band) will be used may be determined according to the frequency pattern arranged in each cell based on the location information of each MS. Further, in an actual communication environment, the signal to interference ratio in the same band is continually changed by fading and movement of the MS, etc., and thus the signal to interference ratio may be dynamically reflected to determine which frequency partition is used among bands allocated to each cell.

DISCLOSURE

Technical Problem

An object of the present invention devised to solve the problem lies in a method for transmitting, by a base station, uplink power control information.

Another object of the present invention devised to solve the problem lies in a method for receiving, by a mobile station, uplink power control information.

Further another object of the present invention devised to solve the problem lies in a base station device for transmitting uplink power control information.

Further another object of the present invention devised to solve the problem lies in a mobile station device for receiving uplink power control information.

The objects of the present invention are not limited to the objects mentioned above, and other objects will be clearly understood by those skilled in the art from the disclosure below.

Technical Solution

The object of the present invention can be achieved by providing a method for transmitting, by a base station, uplink power control information in a wireless communication system, the method including transmitting, to a mobile station, a first message including first information which is information about an interference and noise level of frequency partitions to which an uplink data channel and an uplink control channel are allocated, wherein the uplink data channel and the uplink control channel may be allocated to different frequency partitions.

The first information may include information on an interference and noise level for the uplink control channel and a difference value between the interference and noise level of the uplink control channel and an interference and noise level of the uplink data channel. The first message further may include information on an interference and noise level on a sounding channel of the mobile station.

The method may further include transmitting to the mobile station the information on the frequency partition to which the uplink data channel and the uplink control channel are allocated. The first message is a message of CDMA Allocation A-MAP IE type.

In another aspect of the present invention, provided herein is a method for receiving, by a mobile station, uplink power control information in a wireless communication system, the method including receiving from a base station a first message including first information which is information about an interference and noise level of frequency partitions to which an uplink data channel and an uplink control channel are allocated, and determining uplink transmission power for the uplink data channel transmission and uplink transmission power for the uplink control channel based on the first information, wherein the uplink data channel and the uplink control channel are allocated to different frequency partitions.

The first information includes information on an interference and noise level for the uplink control channel and a difference value between the interference and noise level of the uplink control channel and an interference and noise level of the uplink data channel.

In another aspect of the present invention, provided herein is a base station apparatus for transmitting uplink power control information in a wireless communication system, the base station apparatus including a transmission antenna configured to transmit to a mobile station a first message including first information which is information about an interference and noise level of frequency partitions to which an uplink data channel and an uplink control channel are allocated, wherein the uplink data channel and the uplink control channel are allocated to different frequency partitions.

The transmission antenna may transmit to the mobile station the information on the frequency partition to which the uplink data channel and the uplink control channel are allocated.

In another aspect of the present invention, provided herein is a mobile station apparatus for receiving uplink power control information in a wireless communication system, the apparatus including a reception antenna configured to receiving from a base station a first message including first information which is information about an interference and noise level of frequency partitions to which an uplink data channel and an uplink control channel are allocated, and a processor configured to determine uplink transmission power for the uplink data channel transmission and uplink transmission power for the uplink control channel based on the first information, wherein the uplink data channel and the uplink control channel are allocated to different frequency partitions.

Advantageous Effects

According to the present invention, when the uplink control channel and the uplink data channel are transmitted in different frequency partitions, as two iotFP values are defined from the CDMA allocation A-MAP IE message and the values are transmitted to a mobile station, the base station may reduce restrictions of the uplink transmission condition of the mobile station, thereby improving communication performance.

The effects of the present invention are not limited to the effects mentioned above, and other effects would be clearly understood by those skilled in the art from the disclosure below.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The following detailed description of the invention includes details to help the full understanding of the present invention. Yet, it will be apparent to those skilled in the art that the present invention can be implemented without these details. For instance, although the following descriptions are given in detail on the assumption of an IEEE (institute of electrical and electronics engineers) 802.16 system or 3GPP (3rd generation partnership project) system, they are applicable to other random mobile communication systems except unique features of IEEE 802.16 and 3GPP.

Occasionally, to prevent the concept of the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In the following description, assume that a terminal is a common name of such a mobile or fixed user stage device as an user equipment (US), a mobile station (MS), an advanced mobile station (AMS) and the like. Assume that a base station is a common name for a random node of a network stage communicating with a terminal as a Node B, an eNode B, a BS (base station), an AP (access point) and the like.

In a mobile communication system, a terminal is able to receive a signal from a base station in downlink. The terminal is able to transmit a signal in uplink as well. Information transmitted or received by the terminal can include data and various kinds of control information. Moreover, various kinds of physical channels exist in accordance with the types and usages of the information transmitted or received by the terminal.

Figure 1:
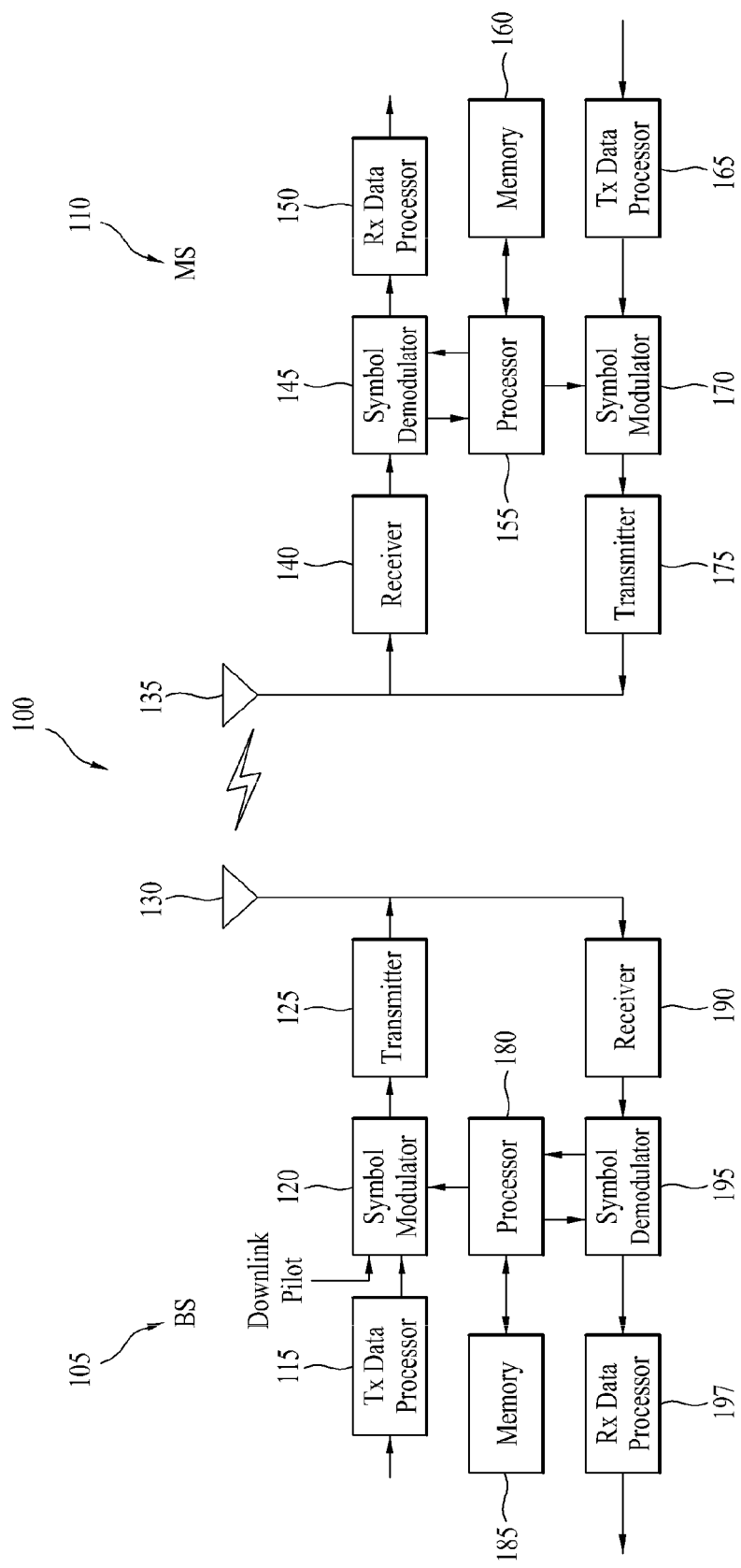
FIG. 1 is a block illustrating a configuration of a base station 105 and a mobile station 110 in a wireless communication system 100.

FIG. 1 is a block diagram showing the configuration of a base station 105 and a mobile station 110 in a communication system 100 according to the present invention.

Although one base station 105 and one mobile station 110 are shown in order to simplify the wireless communication system 100, the wireless communication system 100 may include one or more base stations and/or one or more mobile stations.

Referring to FIG. 1, the base station 105 may include a transmission (Tx) data processor 115, a symbol modulator 120, a transmitter 125, a Tx/Rx antenna 130, a processor 180, a memory 185, a receiver 190, a symbol demodulator 195 and a reception (Rx) data processor 297. The mobile station 110 may include a Tx data processor 165, a symbol modulator 170, a transmitter 175, a Tx/Rx antenna 135, a processor 155, a memory 160, a receiver 140, a symbol demodulator 155 and an Rx data processor 150. Although one antenna 130 and one antenna 135 are respectively shown as being included in the base station 105 and the mobile station 110, each of the base station 105 and the mobile station 110 may include a plurality of antennas. Accordingly, the base station 105 and the mobile station 110 according to the present invention support a multiple input multiple output (MIMO) system. The base station 105 according to the present invention may support both single user (SU)-MIMO and multi user (MU)-MIMO.

In downlink, the Tx data processor 115 receives traffic data, formats and codes the received traffic data, interleaves and modulates (or symbol-maps) the coded traffic data, and provides modulated symbols ("data symbols"). The symbol modulator 120 receives and processes the data symbols and pilot symbols and provides a stream of the symbols.

The symbol modulator 120 multiplexes data and pilot symbols and transmits the multiplexed data and pilot symbols to the transmitter 125. Each transmitted symbol may include a data symbol, a pilot symbol, or a null signal value. The pilot symbols may be contiguously transmitted in symbol periods. The pilot symbols may include frequency division multiplexing (FDM) symbols, orthogonal frequency division multiplexing (OFDM) symbols, time division multiplexing (TDM) symbols or code division multiplexing (CDM) symbols.

The transmitter 125 receives the stream of the symbols, converts the stream into one or more analog signals, and additionally adjusts (e.g., amplifies, filters and frequency up-converts) the analog signals, thereby generating a downlink signal suitable for transmission through a radio channel. Subsequently, the downlink signal is transmitted to a mobile station through the antenna 130.

In the mobile station 110, the antenna 135 receives a downlink signal from the base station and provides the received signal to the receiver 140. The receiver 140 adjusts (for example, filters, amplifies, and frequency down-converts) the received signal, digitizes the adjusted signal, and acquires samples. The symbol demodulator 145 demodulates the received pilot symbols and provides the demodulated pilot signals to the processor 155, for channel estimation.

The symbol demodulator 145 receives a frequency response estimation value for downlink from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps), deinterleaves and decodes the data symbol estimation values and restores the transmitted traffic data.

The processes performed by the symbol demodulator 145 and the Rx data processor 150 are complementary to the processes by the symbol modulator 120 and the Tx data processor 115 of the base station 105.

In the mobile station 110, the Tx data processor 165 processes traffic data and provides data symbols in uplink. The symbol modulator 170 receives the data symbols, multiplexes the data symbols with pilot symbols, performs modulation, and provides a stream of symbols to the transmitter 175. The transmitter 175 receives and processes the stream of symbols, generates an uplink signal, and transmits the uplink signal to the base station 105 through the antenna 135.

In the base station 105, the uplink signal is received from the mobile station 110 through the antenna 130. The receiver 190 processes the received uplink signal and acquires samples. Subsequently, the symbol demodulator 195 processes the samples and provides pilot symbols and data symbol estimation values received in uplink. The Rx data processor 197 processes the data symbol estimation values and restores the traffic data transmitted from the mobile station 110.

The respective processors 155 and 180 of the mobile station 110 and the base station 105 instruct (for example, control, adjust, or manage) the operations of the mobile station 110 and the base station 105, respectively. The processors 155 and 180 may be connected to the memories 160 and 185 for storing program code and data, respectively. The memories 160 and 185 are respectively connected to the processor 180 so as to store operating systems, applications and general files.

The processors 155 and 180 may be called controllers, microcontrollers, microprocessors, microcomputers, etc. The processors 155 and 180 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 155 and 180.

If the embodiments of the present invention are implemented by firmware or software, the firmware or software may be configured to include modules, procedures, functions, etc. for performing the functions or operations of the present invention. The firmware or software configured to perform the present invention may be included in the processors 155 and 180 or may be stored in the memories 160 and 185 so as to be executed by the processors 155 and 180.

Layers of the radio interface protocol between the base station and the mobile station in the wireless communication system (network) may be classified into a first layer (L1), a second layer (L2) and a third layer (L3) based on the three low-level layers of the well-known Open System Interconnection (OSI) model of a communication system. A physical layer belongs to the first layer and provides an information transport service through a physical channel. A Radio Resource Control (RRC) layer belongs to the third layer and provides control radio resources between the mobile station and the network. The mobile station and the base station exchange RRC messages with each other through a wireless communication network and the RRC layer.

Hereinafter, a method for determining, by a mobile station, uplink transmission power will be described using Equation 1 below in IEEE 802.16m, which is an example of a mobile communication system. Generally, a mobile station needs to determine an uplink transmission power value when transmitting an uplink signal.

$$P(dBm) = L + SINR_{Target} + NI + \text{Offset} \qquad \text{Equation 1}$$

Here, P represents a transmission power level (unit: dBm) for the current transmission per each sub-carrier and stream, and L represents a current downlink propagation loss assumed by the mobile station. L includes a transmission antenna gain and a path loss. $SINR_{Target}$ is a target uplink SINR (Signal to Interference plus Noise Ratio) value which the MS received from the BS. NI is an average noise and interference level (unit: dBm) for each subcarrier assumed in the base station, and is a value which the MS receives from the BS. Offset is a compensation term for a power offset for each MS. This offset value is transmitted from the base station through the power control message, and there are two kinds of offset values, one of which is Offsetdata, an offset value used in data transmission, and the other of which is Offsetcontrol, an offset value used for control information transmission.

When applying Equation 1, in the case of the control channel which transmits control information, the MS may promptly apply a signal to interference plus noise ratio (SINR) value corresponding to the control channel using predefined Table 1 below.

TABLE 1

| Control Channel Type | $SINR_{Target}$ Parameters |
|---|---|
| HARQ Feedback | targetHarqSinr |
| Synchronized Ranging | targetSyncRangingSinr |
| P-FBCH | targetPfbchSinr |
| S-FBCH | targetSfbchBaseSinr |
|  | targetSfbchDeltaSinr |
| Bandwidth Request | targetBwRequestSinr |

However, if the MS transmits data, the target SINR value needs to be set using Equation 2 below.

$$SINR_{Target} = \qquad \text{Equation 2}$$
$$10\log10\left(\max\left(10 \wedge \left(\frac{SINR_{MIN}(dB)}{10}\right), \gamma_{IoT} \times SIR_{BL} - \alpha\right)\right) - $$
$$\beta \times 10\log10(TNS)$$

Here, $SINR_{MIN}(dB)$ is the minimum SINR value required in the base station, and is a value which is set as a unicast power control message. $SINR_{MIN}$ is expressed in 4 bits, and the value, for example, may be one of $\{-\infty, -3, -2.5, -1, 0, 0.5, 1, 1.5, 2, 2.5, 3, 3.5, 4, 4.5\}$. $SIR_{DL}$ means a downlink signal to interference power ratio measured by the mobile station.

$\gamma_{IoT}$ is a fairness and IoT control factor, and the base station broadcasts to the mobile station. Alpha($\alpha$) is a coefficient according to the number of received antennas in the base station, and is signaled in 3 bits as MAC power control mode signaling. At this time, the value, for example, may be expressed as a value such as $\{1, \frac{1}{2}, \frac{1}{4}, \frac{1}{8}, \frac{1}{16}, 0\}$. Beta($\beta$) may be set to 0 or 1 as 1 bit MAC power control mode signaling.

TNS is a total number of streams in the logical resource unit (LRU) indicated by UL-A-MAP IE. In the case of single user-MIMO (SU-MIMO), this value is set to Mt, and the Mt is the number of streams per user. In the case of the CSM, this value is set to the TNS and is a total number of streams. In the case of the control channel transmission, this value may be set to 1.

Likewise, the processor 155 of the MS may determine the uplink transmission power using ■ L, NI, offset, $SINR_{Target}$ values.

Since there are situations when parameters related to the uplink power control are not appropriately received at the time of initial ranging or handover ranging, it is difficult for the normal power control to be applied. That is, the mobile station has a hard time in performing power control during the period because of misdetection, etc. by delay, error and period of messages including power control parameters.

Figure 2:
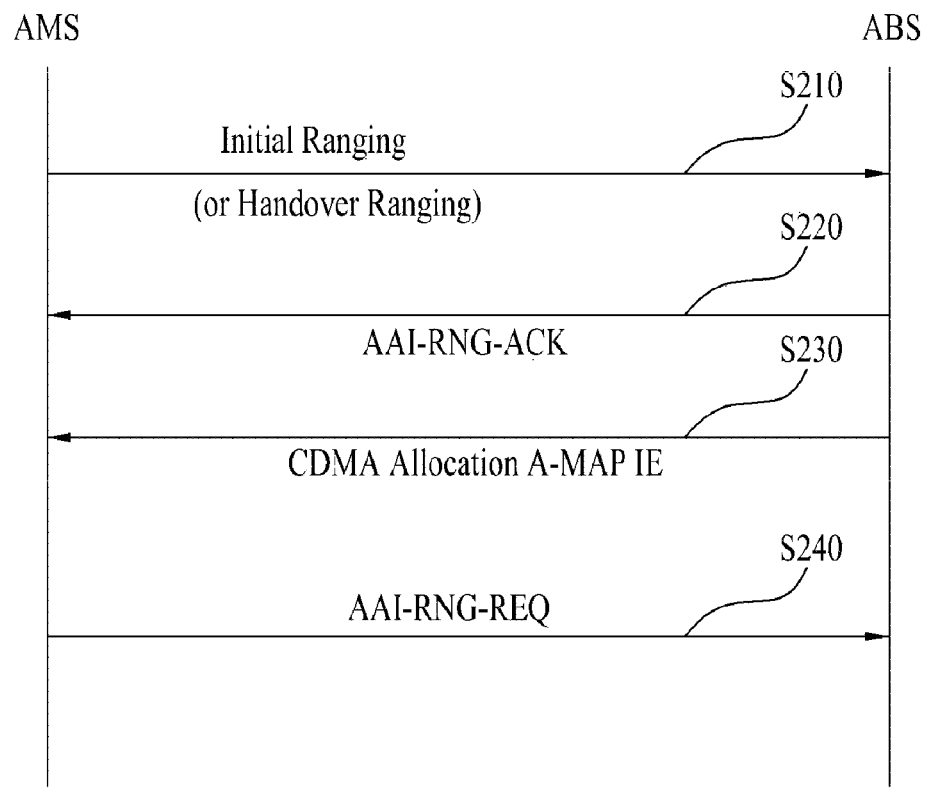
FIG. 2 illustrates a process of performing initial ranging and handover ranging.

FIG. 2 illustrates a process for performing, by a mobile station (MS), initial ranging or handover ranging.

Referring to FIG. 2, a MS transmits initial ranging or handover ranging to a base station (S210) (hereinafter, it is assumed that the MS transmits initial ranging). Initial ranging is a process in which a MS obtains accurate timing offset with the BS and makes an initial transmission power adjustment. Normally, if the power of the MS is turned on, the MS acquires downlink synchronization from a downlink preamble signal. Subsequently, the MS performs initial ranging to adjust uplink timing offset and transmission power. The MS selects a ranging preamble code from the initial ranging domain after selecting a ranging channel, and transmits a ranging preamble code selected to the base station through the selected ranging channel (S210).

Here, values calculated by the following Equation 3 or Equation 4 may be used as the transmission power value for initial ranging transmission. If the MS transmits initial ranging or handover ranging to the base station with the transmission power value calculated using the following Equation 3 or Equation 4, the base station may recognize the power spectral density (PSD) level of the MS.

Equation 3 below is a Equation for calculating transmission power of an uplink signal used when the MS performs initial ranging.

$$P_{TX\_IR\_MIN} = EIRxP_{IR,min} + BS\_EIRP - RSS \qquad \text{Equation 3}$$

Here, $EIRxP_{IR,min}$ represents the minimum target reception power, and BS_EIRP represents the transmission power of the base station. The BS_EIRP is transmitted to the MS through S-SFH SP2 and SP1. The received signal strength (RSS) represents a received signal strength measured by the MS.

When the MS performs initial ranging, the value, which is the sum of the minimum target reception power value $EIRxP_{IR,min}$) and the transmission power value (BS_EIRP) of the base station minus the received signal strength value (RSS), may be used as the transmission power value for initial ranging.

If the reception gain and the transmission gain of the MS antenna are different, the following Equation 4 may be used when performing initial ranging.

$$P_{TX\_IR\_MIN} = EIRxP_{IR,min} + BS\_EIRP - RSS + (G_{Rs\_MS} - G_{Ts\_MS}) \qquad \text{Equation 4}$$

Here, $G_{Rx\_MS}$ represents the reception gain of the MS antenna, and $G_{Tx\_MS}$ represents the transmission gain of the MS antenna. When performing initial ranging, the MS may use the value, which is produced by adding up the value which is obtained by deducting the transmission gain from the reception gain of the MS antenna in addition to the Equation 3 and the expressed item.

Equation 3 and Equation 4 have been explained as transmission power values used at the time of initial ranging transmission by the MS, but may also be used when the MS performs handover ranging.

Thereafter, the base station may transmit a ACK message for initial ranging or handover ranging transmission by the MS to the MS (S220). Here, this ACK message may be defined as an AAI-RNG-ACK message. The AAI-RNG-ACK message is a message that provides an acknowledgement that all of ranging preamble codes have been successfully received and detected in all ranging opportunities. The base station may transmit the AAI-RNG-ACK message including three possible ranging statuses for initial ranging or handover ranging to the MS. Here, the three possible ranging statuses included in the AIA-RNG-ACK message may "continue" status, "success" status" and "abort" status.

At "continue" status, the AAI-RNG-ACK message may include necessary adjustment information. The AAI-RNG-ACK message may include adjustment information such as time, power, frequency, etc. For example, the currently defined power adjustment level included in the AAI-RNG-ACK message (e.g., 3 bits) compensates power when performing the next initial ranging or handover ranging. This is valid until the status becomes "success" status, but even at the time of AAI-RNG-ACK, which transmits the last "success" status message, the power value may be compensated using the power adjustment level parameter. Even when additionally needed, the MS may perform compensation for the initial ranging or handover ranging.

In the case in which the ranging status about the initial ranging or handover ranging is "success" status, the base station may transmit information needed for AAI-RNG-REQ message transmission to the MS through CDMA Allocation A-MAP IE (S230). That is, the BS provides uplink resource allocation information for the ranging request transmission, etc. to the MS through CDMA Allocation A-MAP IE message indicated in Table 2 below. Table 2 below is the CDMA Allocation A-MAP IE message format of IEEE 802.16, and shows information included in the CDMA Allocation A-MAP IE.

TABLE 2

| Syntax | Size (Bits) | Notes |
|---|---|---|
| CDMA_Allocation_A-MAP IE ( ) { | — | |
| A-MAP IE Type | 4 | CDMA Allocation A-MAP IE |
| CDMA allocation indication | 1 | 0b0: Bandwidth allocation in response to a received contention-based bandwidth request. 0b1: Bandwidth allocation in response to a received contention-based ranging request |
| If (CDMA allocation indication == 0b0) { | | |
| Resource Index | 11 | 5 MHz: 0 in first 2 MSB bits + 9 bits for resource index 10 MHz: 11 bits for resource index 20 MHz: 11 bits for resource index Resource index includes location and allocation size. |
| Long TTI Indicator | 1 | Indicates number of AAI subframes spanned by the allocated resource. 0b0: 1 AAI subframe (default) 0b1: 4 UL AAI subframes for FDD or all UL AAI subframes for TDD) If number of DL AAI subframes, D, is less than number of UL AAI subframes, U, Long TTI Indicator = 0b1 |
| HFA | 3 | HARQ Feedback Allocation |
| Reserved | 20 | Reserved bits |
| } Else if (CDMA allocation indication == 0b1) { | | |
| Uplink/Downlink Indicator | 1 | Indicates whether the following fields are for resource assignment in the uplink or in the downlink). 0b0: Uplink0b1: Downlink |
| Resource Index | 11 | 5 MHz: 0 in first 2 MSB bits + 9 bits for resource index 10 MHz: 11 bits for resource index 20 MHz: 11 bits for resource index Resource index includes location and allocation size. |
| $I_{SizeOffset}$ | 5 | Offset used to compute burst size index |
| HFA | 3 | HARQ Feedback Allocation |
| If (Uplink/Downlink Indicator == 0b0) { | | |
| iotFP | 7 | IoT value of Frequency Partition used for AMS resource assignment, quantized in 0.5 dB steps as IoT level from 0 dB to 63.5 dB., detail reference to 16.2.3.30 AAI-ULPC-NI message |
| offsetControl | 6 | offsetControl is the transmit power adjustment value transmitted by the ABS. It represents the value amon −15.5 to 16 dB with 0.5 dB step |
| AI_SN | 1 | HARQ identifier sequence number |
| Long TTI Indicator | 1 | Indicates number of AAI subframes spanned by the allocated resource. 0b0: 1 AAI subframes (default) 0b1: 4 UL AAI subframes for FDD or all UL AAI subframes for TDD) If number of DL AAI subframes, D, is less than number of UL AAI subframes, U, Long TTI Indicator = 0b1) |
| } Else { | | |
| ACID | 4 | HARQ channel identifier |
| AI_SN | 1 | HARQ identifier sequence number |
| SPID | 2 | HARQ subpacket identifier for HARQ IR |
| Reserved | 8 | Reserved bits |
| } } } | | |

Referring to Table 2, if the MS transmits ranging to the base station, the base station may transmit uplink resource information allocated for transmission of the ranging request message to the MS through the resource index field, etc.

If the ranging status for initial ranging or handover ranging is "abort" state, the base station requests the abort of the ranging process to the BS.

As described above, the mobile station may receive a response to the ranging status from the base station through AAI-RNG-ACK message. The MS, which has received the response message on the ranging status from the base station, may perform the following procedure according to the ranging status.

If "continue" status response and parameter adjustments are received through AAI-RNG-ACK message, the MS compensates (or adjusts) parameters, and continues to perform the ranging process as in the initial entry ranging which has been performed using the available ranging channels with an arbitrary ranging preamble code selected in the initial ranging domain. That is, the mobile station transmits a message which requests ranging to the base station (S240). Here, the message, which requests ranging, may be expressed as AAI-RNG-REQ message.

If the MS receives "success" status response through AAI-RNG-ACK message, the MS waits until the BS provides uplink resource allocation. After the MS transmits a ranging preamble code (S210), if the MS fails to receive CDMA Allocation A-MAP IE for uplink resource allocation until a preset time expires, the initial ranging procedure is performed again, but it if it is difficult for the initial ranging procedure to be performed again, the downlink physical channel synchronization with the base station needs to be performed again.

On the other hand, if the MS receives the CDMA Allocation A-MAP IE from the base station (S230), the MS transmits a message requesting ranging to the base station (S240).

Up to now, a process of initial ranging or handover ranging by the MS has been described. The uplink transmission power value, which is used at the time of initial ranging or handover ranging by the MS (S210), is the value having been calculated by Equation 3 or Equation 4 above.

As mentioned above, even if the MS does not receive parameters related with the power control at the time of initial network entrance/reentrance from the base station, the Ms may perform uplink power control using the default value. For example, the serving base station transmits an iotFP (i.e., IoT value per frequency partition), which is a value that is dynamically changed, to the US through CDMA Allocation A-MAP IE as shown in Table 2 above, and the remaining power control parameters may be set to default values and used. Table 3 below shows an example of default uplink power control (default ULPC) parameters.

TABLE 3

| Type | Parameters | Default value |
| --- | --- | --- |
| Data Channel Control Parameters | Alpha | 1/2 |
| | Beta | 0 |
| | Garmma | 0.5 |
| | dataSinrMin | 3 dB |
| | dataSinrMax | 40 dB |
| Control Channel Target SINR Value | targetHarqSinr | 2 dB |
| | targetInitialRangingSinr | 0 dB |
| | targetSyncRangingSinr | −3 dB |
| | targetPfbchSinr | 0 dB |
| | targetSfbchBaseSinr | 1.5 dB |
| | targetSfbchDeltaSinr | 0.24 dB |
| | targetBwRequestSinr | 0.5 dB |
| Offset Initialization | offsetData | 0 |

Then the processor 155 of the MS may produce NI using ioTFP value of the CDMA Allocation A-MAP IE received from the base station to determine uplink transmission power for first uplink transmission after completion of the initial network entrance/reentrance. Equation 5 below shows a Equation for acquiring NI by the processor 155 of the MS.

$$NI = P_{TN} + IoT + 10 \log 10(\Delta f) \qquad \text{Equation 5}$$

Here, $P_{TN}$ represents thermal noise power density, and f represents subcarrier spacing (Hz).

The processor 155 of the MS produces iotFP value received through CDMA Allocation A-MAP IE message from the base station, i.e., NI value using the interference level (i.e., IoT value) in the corresponding frequency partition, and may determine the uplink transmission power for first uplink transmission after network entrance/reentrance, etc. using the produced NI value. Further, an offset value is necessary to determine the uplink power for first uplink transmission as in Equation 1.

Further, if the first uplink transmission of the MS is data channel transmission, the base station may transmit the offset value in the form of offsetData parameter, and if the first uplink transmission is control channel transmission, the base station may transmit the offset value in the form of offsetControl parameter. The serving base station may transmit both offsetData parameter and offsetControl parameter to the UE, or may selectively transmit the parameters.

Then the processor 155 of the MS may determine transmission power for first uplink transmission after network entrance/reentrance using the offset set value received from the base station and the IoT value for the frequency partition. Particularly, the base station may transmit offsetControl parameter to the MS through CDMA Allocation A-MAP IE message as shown in Table 2 above.

When the processor 155 of the MS determines transmission power for first uplink transmission, predetermined default values may be used as the remaining necessary power parameters other than the offset value and IOT-FPx parameter.

Referring to Table 2, the base station may inform the MS of iotFP as one value in CDMA Allocation A-MAP IE message. However, in a system environment operated at fractional frequency reuse (FFR) mode, the base station needs to inform the MS of the assumed IoT value per frequency partition (FP), and thus the fact that only one iotFP value is defined in the CDMA Allocation A-MAP IE message and is then notified to the MS, may become a restriction in operating the system. That is, if the base station defines only one iotFP value in the CDMA Allocation A-MAP IE message and transmits the value to the MS, there is a disadvantage that the frequency partition of the ioTFP may be appropriately performed only in the case in which the uplink control channel and the uplink data channel are allocated to the same FP.

Hence, if the uplink control channel and the uplink data channel are transmitted in different FPs, two iotFP values may need to be defined in the CDMA Allocation A-MAP IE message. Likewise, in the case in which two iotFP values are defined, the base station may inform the MS of the iotFP value of the uplink data channel and the iotFP value of the uplink control channel, respectively, or may inform the MS of the difference value for the remainders based on the ioT of one frequency partition. For example, the base station may inform the MS of the iotFP value of the uplink data channel as the difference value based on the IoT value of the frequency partition to which the uplink control channel has been allocated (i.e., the iotFP value of the uplink control channel).

In this case, the index information of the FP for uplink data allocation may be explicitly signaled to the MS by the base station so that the MS may recognize the information or the MS may implicitly recognize the information. For example, in the case in which the system is operated in FFR mode, if there is a FP0 whose frequency reuse rate is 1, the area where the uplink control channel may be transmitted is set to FP0, and if there is no FP0 whose frequency reuse rate is 1, the information may be transmitted to the power-boosted area (FPi) determined by the FFP pattern per cell/sector. The MS may implicitly recognize the FP of the control channel area based thereon.

As another method, the base station may add the iotFP value to CDMA Allocation A-MAP IE of Table 2 along with FP index for the FP for the data region, and transmit the information to the MS. Further, the base station may implicitly inform the MS of the FP information of the data channel by setting the sum of the FP index value, to which the control channel has been allocated in advance, and k, to the FP index of the data channel.

Further, the IoT value for the sounding channel also needs to be added to the CDMA Allocation A-MAP IE message shown in Table 2 for definition. If the MS fails to receive the AAI-UL NI (Noise and Interference Level) broadcast message, the sounding channel cannot be transmitted. Hence, in preparation for such a case, the base station may add the IoT value for the sounding channel to the CDMA Allocation A-MAP IE, and then transmit the information to the MS.

As described above, in the case in which the uplink data channel and the uplink control channel are allocated to different frequency partitions, respectively, the base station may inform the MS of the IoT value for each frequency partition through the CDMA Allocation A-MAP IE message, or add the IoT value for the sounding channel through CDMA Allocation A-MAP IE message and inform the MS of the information, but the present invention is not limited to the CDMA Allocation A-MAP IE message, and it is possible to use a new message type or all message types which can be transmitted to the MS in the base station in the initial network entrance/reentrance/handover process. Some examples thereof are AAI-RNG-RSP, AAI-REQ-RSP message, etc. Likewise, the IoT level per partition (i.e., IoT value per frequency partition) and the IoT level for the sounding channel may be notified to the MS through one message (e.g., CDMA Allocation A-MAP IE message), or the IoT level per frequency partition and the IoT level for the sounding channel may be transmitted by the base station to the MS through different messages.

The MS may transmit the uplink power status report (in 3GPP LTE system, also called power headroom report (PHR)) to the base station in a power status report header type. If the uplink data channel and the uplink control channel are allocated to different frequency partitions, respectively, in a message such as CDMA Allocation A-MAP IE, etc. and the base station informs the MS of the IoT value per frequency partition through the CDMA Allocation A-MAP IE message, the MS may need to report the uplink power status along with the frequency partition. That is, the MS needs to notify the base station of whether the report is a power status report on the frequency partition to which the uplink data channel has been allocated or a power status report on the frequency partition to which the uplink control channel has been allocated.

According to the prior art, the MS has defined the frequency partition for the power status report as only the first FP index. However, at the FFP operation mode, if there is an FP0 (FP whose index is 0) area, the frequency partition, where the uplink control channel is transmitted, may be the area, and if there is no FP0, the partition may be a power-boosted frequency partition. Hence, since the uplink control channel may be transmitted in an FP index other than the index (FP0) of the first FP, the MS needs to be newly defined so that the power status report needs to be performed for the frequency partition where the MS transmits the uplink control channel.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention is applicable to various communication systems such as 3GPP LTE, LTE-A, IEEE 802, etc.

The invention claimed is:

1. A method for transmitting, by a base station, uplink power control information in a wireless communication system, the method comprising:
    transmitting, to a mobile station, a first message including information about an interference and noise level of frequency partitions to which an uplink data channel and an uplink control channel are allocated,
    wherein the uplink data channel and the uplink control channel are allocated to different frequency partitions, and
    wherein the first message further includes information on an interference and noise level for the uplink control channel and a difference value between the interference and noise level of the uplink control channel and an interference and noise level of the uplink data channel.

2. The method according to claim 1, wherein the first message further includes information on an interference and noise level on a sounding channel of the mobile station.

3. The method according to claim 1, further comprising:
    transmitting, to the mobile station, the information on the frequency partition to which the uplink data channel and the uplink control channel are allocated.

4. The method according to claim 1, wherein the first message is a message of CDMA Allocation A-MAP IE type.

5. A method for receiving, by a mobile station, uplink power control information in a wireless communication system, the method comprising:
    receiving, from a base station, a first message including information about an interference and noise level of frequency partitions to which an uplink data channel and an uplink control channel are allocated; and
    determining uplink transmission power for the uplink data channel transmission and uplink transmission power for the uplink control channel based on the first information,
    wherein the uplink data channel and the uplink control channel are allocated to different frequency partitions, and
    wherein the first message further includes information on an interference and noise level for the uplink control channel and a difference value between the interference and noise level of the uplink control channel and an interference and noise level of the uplink data channel.

6. A base station apparatus for transmitting uplink power control information in a wireless communication system, the base station apparatus comprising:
    a transmission antenna configured to transmit, to a mobile station, a first message including information about an interference and noise level of frequency partitions to which an uplink data channel and an uplink control channel are allocated, wherein the uplink data channel and the uplink control channel are allocated to different frequency partition, and wherein the first message further includes information on an interference and noise level for the uplink control channel and a difference value between the interference and noise level of the uplink control channel and an interference and noise level of the uplink data channel.

7. The base station apparatus according to claim 6, wherein the first message further includes information on an interference and noise level on a sounding channel of the mobile station.

8. The base station apparatus according to claim 6, wherein the transmission antenna transmits to the mobile station the information on the frequency partition to which the uplink data channel and the uplink control channel are allocated.

9. The base station apparatus of claim 6, wherein the first message is a message of CDMA Allocation A-MAP IE type.

10. A mobile station apparatus for receiving uplink power control information in a wireless communication system, the mobile station apparatus comprising:

a reception antenna configured to receive from a base station a first message including information about an interference and noise level of frequency partitions to which an uplink data channel and an uplink control channel are allocated; and a processor configured to determine uplink transmission power for the uplink data channel transmission and uplink transmission power for the uplink control channel based on the first information, wherein the uplink data channel and the uplink control channel are allocated to different frequency partitions, and wherein the first message further includes information on an interference and noise level for the uplink control channel and a difference value between the interference and noise level of the uplink control channel and an interference and noise level of the uplink data channel.

* * * * *